United States Patent [19]

Allera et al.

[11] Patent Number: 5,291,852

[45] Date of Patent: Mar. 8, 1994

[54] DISC BRAKE PARTICULARLY FOR AN AUTOMOTIVE VEHICLE

[75] Inventors: Hubert Allera, Chatenay Malabry; Guy Prud'Homme, Sainte Foy Les Lyon, both of France

[73] Assignees: Carbone Industrie, Bagnolet; Ligier Sports, Magny Cours, both of France

[21] Appl. No.: 741,429

[22] PCT Filed: Nov. 30, 1990

[86] PCT No.: PCT/FR90/00870

§ 371 Date: Aug. 1, 1991

§ 102(e) Date: Aug. 1, 1991

[87] PCT Pub. No.: WO91/08128

PCT Pub. Date: Jun. 13, 1991

[30] Foreign Application Priority Data

Dec. 1, 1989 [FR] France .................. 89 15928

[51] Int. Cl.[5] ............... B60T 1/06; F16D 65/853
[52] U.S. Cl. ............... 188/18 A; 188/264 AA; 188/264 D
[58] Field of Search .......... 188/18 A, 71.1, 71.4, 188/71.6, 72.4, 72.6, 73.2, 264 A, 264 AA; 192/70.12, 85 AA

[56] References Cited

U.S. PATENT DOCUMENTS

| | | | |
|---|---|---|---|
| 2,655,236 | 10/1953 | Bachman | 188/264 AA |
| 3,121,477 | 2/1964 | Maloney et al. | 188/72.5 |
| 3,400,789 | 9/1968 | Mione | 188/264 AA |
| 3,850,267 | 11/1974 | Odier | 188/264 AA |
| 3,940,159 | 2/1976 | Pringle | 188/18 A |
| 3,983,974 | 10/1976 | Dowell et al. | 188/264 AA |
| 4,011,055 | 3/1977 | Hill et al. | 188/251 A |
| 4,790,413 | 12/1988 | Meyniev | 188/18 A |
| 4,890,699 | 1/1990 | Megginson et al. | 188/18 A |
| 4,926,977 | 5/1990 | Gassiat | 188/18 A |

FOREIGN PATENT DOCUMENTS

| | | | |
|---|---|---|---|
| 2641159 | 6/1976 | Fed. Rep. of Germany . | |
| 2736968 | 2/1979 | Fed. Rep. of Germany . | |
| 2750119 | 5/1979 | Fed. Rep. of Germany . | |
| 2211078 | 7/1974 | France . | |
| 2615258 | 7/1987 | France . | |
| 2607566 | 6/1988 | France . | |
| 0031729 | 2/1987 | Japan | 188/264 AA |
| 1154786 | 6/1969 | United Kingdom . | |
| 2026962 | 2/1980 | United Kingdom | 188/18 A |
| 2184801A | 7/1987 | United Kingdom . | |
| 2197924 | 6/1988 | United Kingdom | 188/264 A |

*Primary Examiner*—Robert J. Oberleitner
*Assistant Examiner*—Chris Schwartz
*Attorney, Agent, or Firm*—Bacon & Thomas

[57] ABSTRACT

The present invention relates to a disc brake for an automobile including a disc comprising an outer part made of carbon/carbon mounted to slide axially on an inner part fixed to a stub axle. Pads, configured as rings coaxial to the disc, define braking surfaces which totally cover the axial faces of the outer part. The pads, also preferably formed of carbon/carbon, are mounted in a pad support in the form of a cage thermally protected from the pads by radiators. Jacks are interposed between an annular shield of the pad support and one of the pads to shift the pad relative to the disc.

15 Claims, 3 Drawing Sheets

DISC BRAKE PARTICULARLY FOR AN AUTOMOTIVE VEHICLE

TECHNICAL DOMAIN

The present invention relates to disc brakes, particularly for automotive vehicles.

PRIOR ART

The prior art discloses, particularly by publication GB-A-2 184 801, disc brakes, for a vehicle wheel, of the type comprising, on the one hand, a disc attached to the wheel, coaxial thereto and constituted by a concentric annular part mounted in angular drive relation with the wheel while being axially mobile with respect thereto, such a disc presenting a plurality of radial passageways open at their ends and intended for air cooling and, on the other hand, two brake pads borne by a pad support attached to a fixed hub of the vehicle. These pads are disposed on either side of the disc and provide friction surfaces capable of exerting tighteninq forces on the disc under the action of a control arrangement.

This known type of brake is currently used in automotive vehicles. The disc is generally made of metal and the pads, made of a friction material, are mounted on stirrup elements. During braking, the variation of the kinetic energy of the vehicle is converted into heat. The disc heats up and may attain a high temperature, close to 600° C. It is known that the braking qualities of the materials rapidly degrade at higher temperatures, and this is why, in order to facilitate cooling of the disc by air, the pads generally cover only a sector of the disc. On the other hand, the diameter of the disc is relatively large, so that the friction surfaces of the pads are sufficient. However, with the disc not being totally protected by the pads, a film of water or of oil may, due to splashing, be formed on its surface. This film considerably deteriorates the qualities of the brake. Moreover, the repeated use of the brake, in particular in the mountains, brings about an excessive heating of the disc and a considerable degradation of the braking capacities of the vehicle.

It is known to use, such as in an aircraft, disc brakes made of a material resistant to high temperature and cooperating with pads made of the same material. Such brakes may be constituted by stacks of rotors and stators constituting a "heat well" of which the heat capacity makes it possible to withstand the energy developed during braking, without it being necessary to seek an in-sense cooling, as an aircraft is braked only upon landing.

A similar constructional technique seems to have been retained by publication FR-AR 211 078 (73-40 996) for the brakes of automotive vehicles. The recommended structure comprises at least one rotating disc with which two annular friction discs may cooperate. Such a structure is similar to a heat well having only slight cooling ability, incompatible with a frequent use of the brake, as is the case of automotive vehicles.

The purpose of the present invention is to provide a brake, particularly for an automotive vehicle, of the type mentioned, which conserves its qualities of braking at high temperatures in which the braking surfaces are protected from the projections of water and oil and in which a very efficient ventilation is ensured.

SUMMARY OF THE INVENTION

The disc brake of the present invention, particularly suitable for use on an automobile is characterized in that:
- the disc comprises a so-called outer annular part, and an inner annular part removably fitted on the wheel hub and bearing the annular part with which it defines axial openings,
- each brake pad has the configuration of a ring coaxial to the disc and is dimensioned so that its inner face, forming a friction surface, totally covers the adjacent face of the outer part,
- and in that, both the annular part and the pads are made of carbon/carbon, present a plurality of radial passageways open at their ends, intended for cooling them by air and are covered, over all their surfaces, except for the friction surfaces, with a layer of anti-oxidant paint.

Thanks to this arrangement, the braking pieces are protected from oxidation by said protection product. Only a thin film of air is capable of being located between the friction surfaces of the pads and of the disc, thus limiting the possible oxidation of these surfaces and, consequently, the wear of the pieces upon braking. The temperatures admitted in the pads and the disc may be notably higher than the temperatures admitted at the present time, without alteration of the braking qualities of the assembly. This allowed rise in temperature promotes the natural exchange of heat with the ambient air. The cooling of the pieces cooperating upon braking is improved by the presence of the radial passageways in which the air circulates, further to the rotation of the wheel and via the axial openings provided between the two parts of the disc. The braking surfaces are protected from the possible projections of oil or water and conserve their braking qualities. The braking surface extends over a ring whose annular width may be relatively small with respect to its diameter. The diameter of this ring may be reduced with respect to the diameter of the cast iron disc of the prior art.

One of the pads, called a fixed pad, is advantageously, fastened to the hub of the vehicle.

The pad support is constituted by a first rigid annular shield coaxial to the disc, disposed in front of the outer axial face of the other pad, called a mobile pad, and connected to the fixed pad by a plurality of small bridges distributed over the periphery of the pad support. The mobile pad cooperates with the bridges to prevent rotation thereof and a control arrangement is provided between the first shield and said mobile pad and is thermally insulated therefrom by the interposition of a thermal protector between them and the mobile pad.

The pad support advantageously comprises a second rigid annular shield coaxial to the disc, which is disposed in front of the outer axial face of the fixed pad and is connected to the first shield by the bridges and thermal protector are interposed between the second shield and the fixed pad.

The control arrangement advantageously comprises a plurality of hydraulic jacks, each jack being disposed in the vicinity of a bridge.

Each jack comprises a chamber, formed in the shield and open towards the mobile pad, and a piston mounted to slide in the chamber and abutting on the outer axial face of the mobile pad, with the interposition of a radiator serving as the thermal protector, the chambers being connected together by oil supply conduits disposed so as to allow a degassing of the hydraulic circuit.

The oil supply conduits are advantageously embedded in the mass of the shield.

Other advantages and characteristics of the invention will appear on reading the following description made by way of a non-limiting example and with reference to the accompanying drawings.

BEST MANNER OF IMPLEMENTING THE INVENTION

Figure 1:
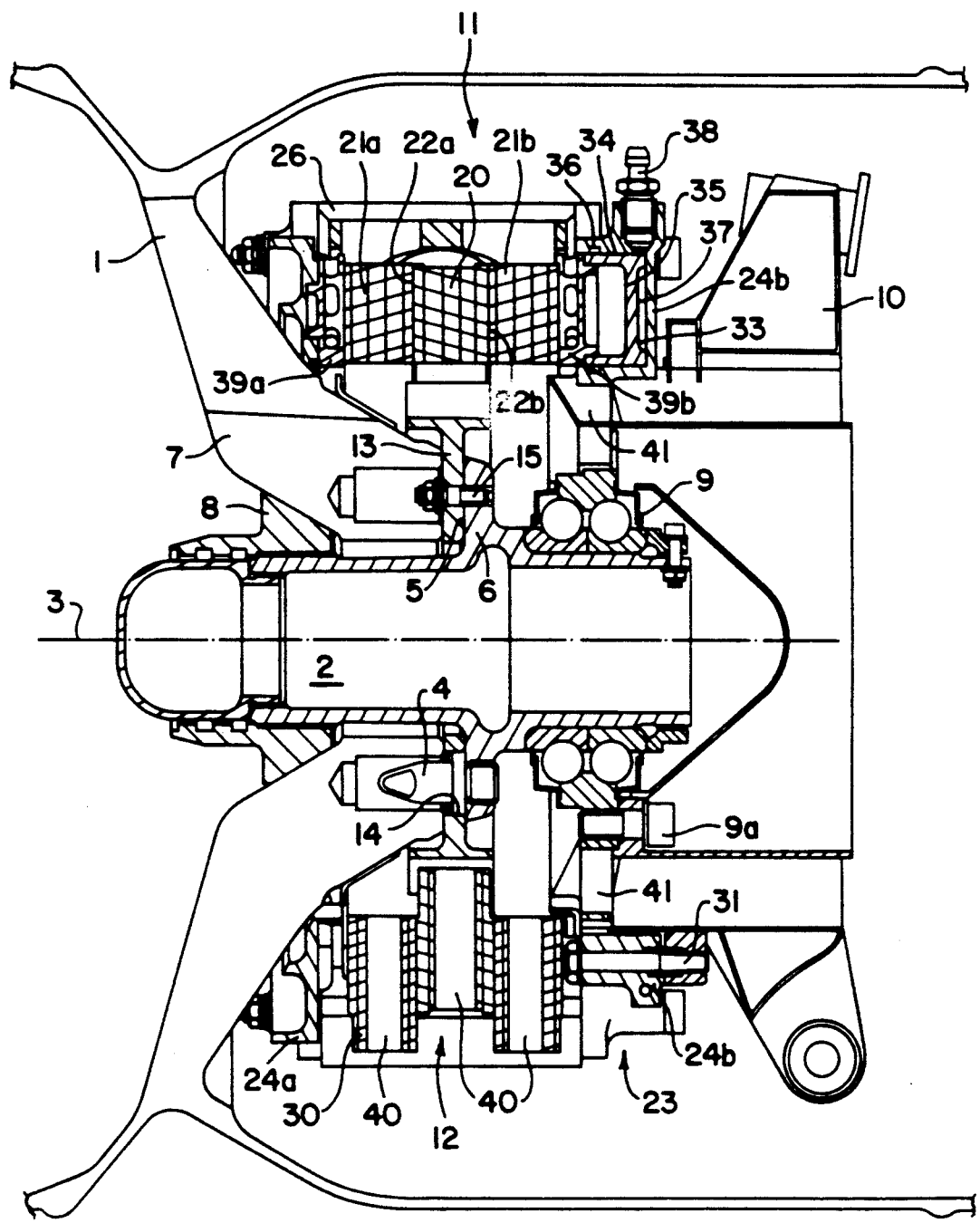
FIG. 1 is an axial section through a brake according to the invention mounted on a wheel of an automobile vehicle.

As shown in the drawing, wheel 1 is held on stub axle 2 of axis 3 with the aid of guiding fingers 4 parallel to axis 3 and extending outwardly of the vehicle from an outer face 5 of an annular shoulder 6 provided on the periphery of the stub axle 2. The guiding fingers 4 penetrate in openings provided in register in the hub 7 of wheel 1 and the latter is blocked on the stub axle 2 with the aid of a nut 8 fixed at the outer end of stub axle 2. Stub axle 2 is mounted, via a roller bearing 9, on a hub 10 connected to the suspension members of the vehicle. The roller bearing 9 is fixed, by screws 9a, on the hub 10. The hub 10 is immobilized in rotation, but it may pivot about a vertical axis when wheel 1 that it bears is steering.

A brake 11 is interposed between wheel 1 and hub 10. This brake comprises a disc 12 of which the inner part 13 is provided with openings 14 for the passage of the guiding fingers 4 and is interposed between the annular shoulder 6 of the stub axle 2 and the hub 7 of the wheel 1. This inner disc part 13 is fixed, on the annular shoulder 6, by fixing screws 15 and it comprises, on its periphery, a plurality of fins 16 which extend outwardly and which are in abutment against the axial walls 17 of tenons 18 which extend inwardly, from the inner wall 19 of a ring forming the outer part 20 of the disc 12. It should be noted that there is an axial opening between two consecutive tenons, said axial openings being intended for the circulation of air for ventilating the brake.

Tenons 18 are interposed between fins 16 so that the outer part 20 of disc 12 can slide axially on the inner part 13 and is immobilized in rotation thereon.

Brake pads 21a and 21b, immobilized in rotation, are disposed on either side of the disc 12. These brake pads 21a and 21b have an annular shape and a template identical to the template of the outer disc cart 20 and they are disposed coaxially to disc 12, so that their respective inner axial surfaces 22a and 22b, which form the braking surfaces, totally cover the adjacent axial faces 20a and 20b of the outer disc part 20.

The brake pads 21a and 21b are borne by a pad support 23 fast with hub 10. The pad support 23 has the form of a squirrel cage and it comprises a first rigid annular shield 24b, coaxial to the axis of rotation 3 and disposed in front of the outer axial face 25b of the pad 21b and a second rigid annular shield 24a disposed in front of the outer axial face 25a of pad 21a.

The two annular shields 24a and 24b are connected together by a plurality of bridges 26, five in number in the drawing, interposed between their inner faces and fixed by a plurality of screws 27. Screws 27 prevent the two annular shields 24a and 24b from moving apart from each other and the bridges 26 prevent them from approaching each other. Each bridge 26 comprises two spacers 26a and 26b parallel to the axis of rotation 3, connected together by diagonal crosspieces 28a and 28b and tie-bars 29a and 29b so as to define a plurality of radial openings 29c for the radial passage of air through each bridge 26. Screws 27 traverse the spacers 26a and 26b. The brake pads 21a and 21b present, on their outer periphery, tenons 30 which extend outwardly and which cooperate with the spacers 26a and 26b in order to immobilize in rotation the brake pads 21a and 21b with respect to the pad support 23, whilst allowing axial displacement thereof.

The first shield 24b is fixed to hub 10 by a plurality of fixing screws 31 and it bears the control means of the brake 11 which are constituted by a plurality of hydraulic jacks 33 interposed between the first shield 24b and the adjacent pad 21b, called mobile pad.

To that end, the first shield 24b presents, in the vicinity of each bridge 26, a cylindrical cavity 34 open towards the mobile pad 21b, opposite the outer axial wall 25b thereof, in which is slidably mounted a piston 35 with the interposition of an O-ring 36, so as to define, towards the bottom of the cavity 34, a tight chamber 37 supplied with oil via a supply conduit. The oil is placed under pressure by actuation of the brake pedal. This supply conduit is embedded in the mass of the first shield 24b and all the chambers 37 are connected together by this oil supply conduit, so that it is easy to drain the circuit with the aid of a bleed screw 38 provided in the upper part of the first shield 24b. Each piston 35 is protected from the heat released upon braking by the mobile pad 21b by a radiator 39b interposed between the piston 35 and the pad 21b and on which the outer skirt of the piston 35 is in abutment.

Similarly, a radiator 39a is interposed between the second shield 24a and the adjacent pad 21a, called fixed pad, in the vicinity of each bridge 26. To that end, the shield 24a also presents cavities 34 intended partly to house the radiators 39a.

The length of the bridges 26 is calculated so that the radiators 39b and 39a are partly located in their respective cavity 34, whatever the force exerted on the pistons 35. Moreover, the outer axial faces 25a and 25b of the pads 21a and 21b are always maintained spaced apart from the adjacent shields 24a and 24b, thanks to an appropriate dimensioning of the radiators 39a and 39b. These latter are made of a material resistant to high temperatures and they comprise a plurality of axial passageways intended to facilitate their cooling by air.

The outer part 20 of the disc 12, as well as the brake pads 21a and 21b, are made of a material resistant to high temperature and, preferably, of carbon and they comprise a plurality of radial passageways 40 intended for cooling them by air. The radial passageways 40 are open at their two ends. Those of the pads 21a and 21b open out, on the one hand, on the outer periphery of the brake and, on the other hand, towards the stub axle 2, in the annular space separating the pads 21a and 21b from the stub axle 2. The radial passageways 40 of the outer part 20 of the disc 12 open out, on the one hand, on the periphery of the brake and, on the other hand, in the axial openings separating the two parts 13 and 20 of disc 12.

Air deflectors are mounted on the pad support 23 and air passage openings 41 are provided on the hub 10, level with the tenons 18 and fins 16 preferably, so as to promote ventilation of the brake 11 during rotation of the wheel 1.

The outer surfaces of the braking pieces, i.e. the outer part 20 of the disc 12 and the brake pads 21a and 21b, are covered with a product for protection against oxidation. The same applies to the walls of the radial passageways 40. Only the braking surfaces of these pieces are not covered with this protecting product. Functioning of the brake 11 will be readily understood. Under the action of the brake pedal, the oil is placed under pressure in chambers 37 and acts on the pistons 3% which, via the radiators 39b, push the mobile pad 21b against the outer part 20 of the disc 12. Said outer part slides, in turn, on the inner part 13 and comes into abutment on the fixed pad 21a. The outer part 20 is thus tightened between the two pads 21a and 21b which are immobilized in rotation by the tenons 30 which are in abutment against the bridges 26. The heat released by the tightening of the brake is distributed in the braking pieces. The latter have limited contact surfaces with, respectively, the inner part 13 of the disc 12 and the pad support 23. This thermal energy is evacuated by the ambient air which circulates in the passageways 40 and in the conduits of the radiators 39a and 39b.

Figure 2:
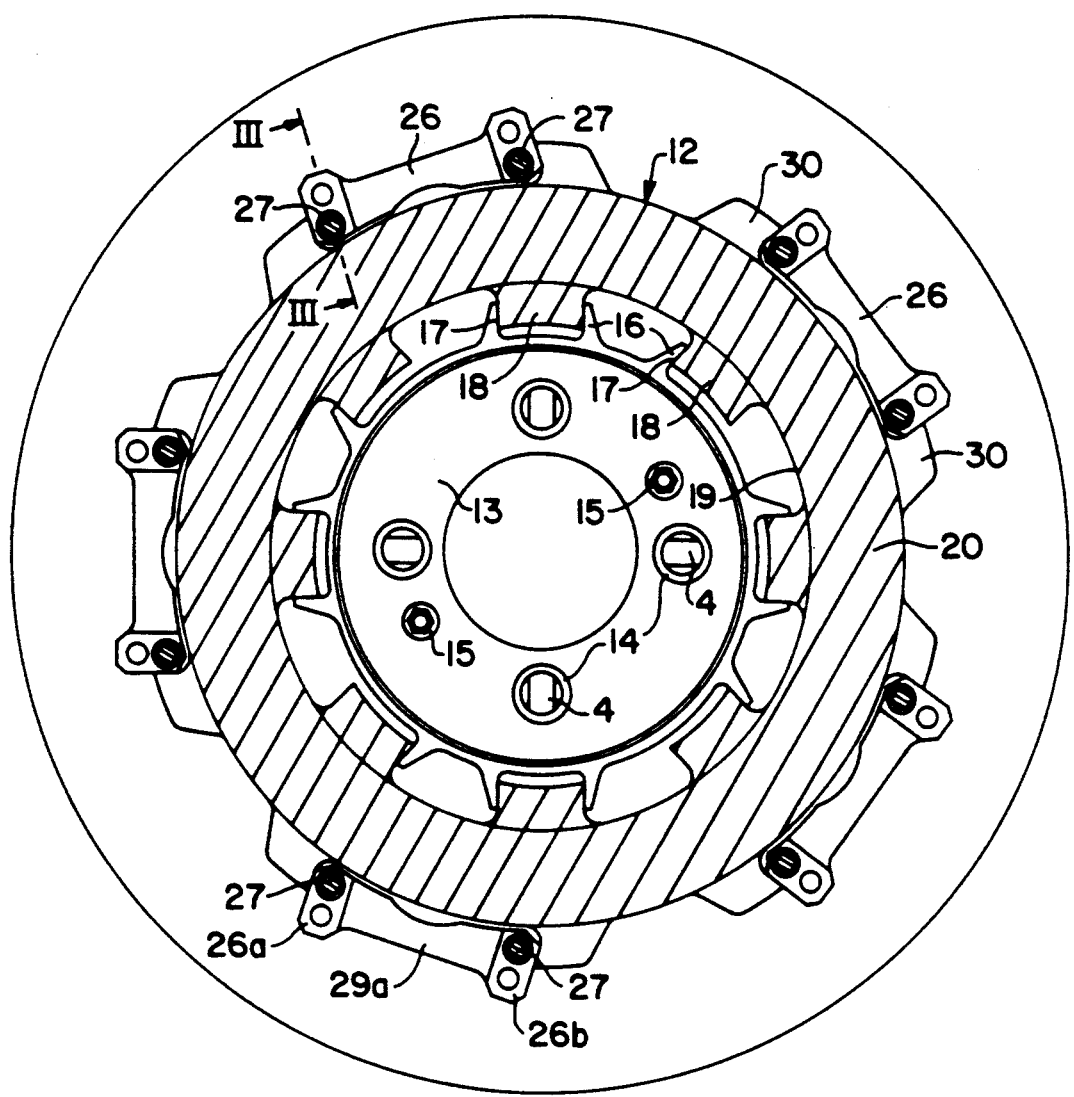
FIG. 2 is a side view of the same brake in which the outer part of the disc is shown in section.
Figure 3:
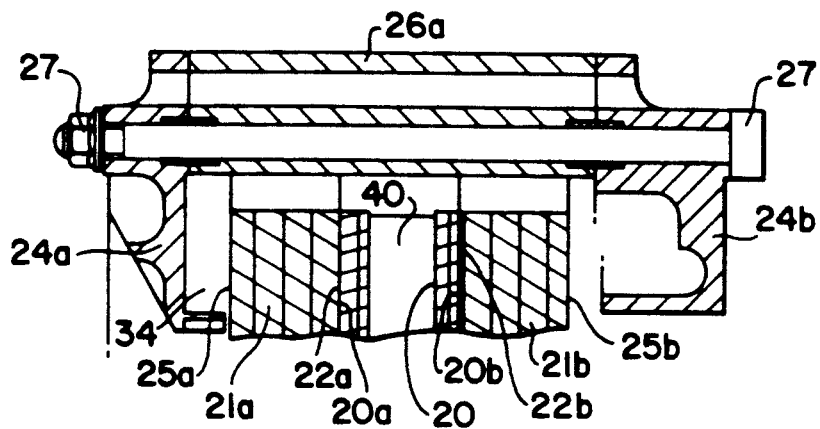
FIG. 3 is a partial section along line III—III of FIG. 2.
Figure 4:
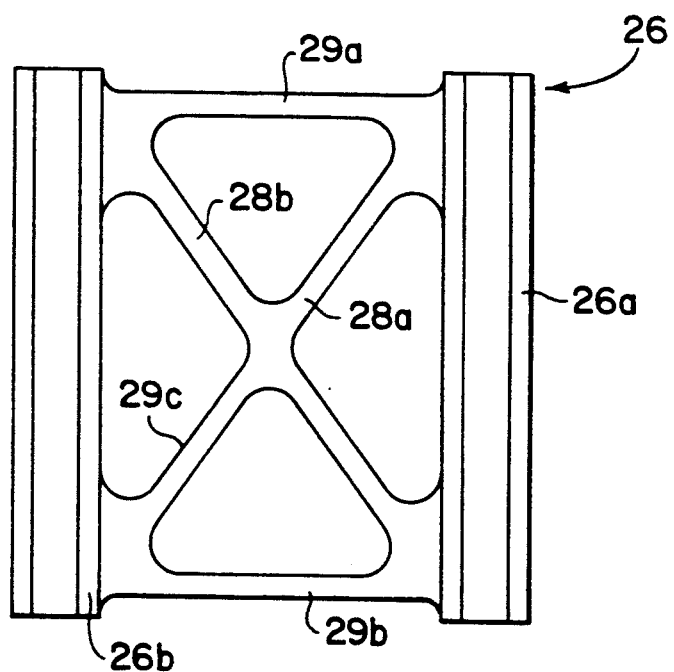
FIG. 4 shows in detail a bridge connecting the shields of the brake.

The forces of reaction to braking are supported by the tenons 30 of the pads 21a and 21b, in abutment on the bridges 26 and the inner tenons 18 of the outer part 20 of the disc in abutment on the fins 16. These forces being a function of the speed of the vehicle in movement are generally clearly greater during a braking of the vehicle moving forwards than during braking of the vehicle in reverse motion, This is why, as is clearly seen in FIG. 2, the fins 16 in abutment on the walls 17 located to the rear of the tenons 18, in the direction of forward motion of the vehicle, are more numerous than the fins in abutment on the other walls 17.

Numerous modifications may be made by the man skilled in the art to the description made hereinabove. In particular, the second shield 24a may be eliminated. In that case, the first shield 24b serving as bearing for the jacks 33, is directly connected by bridges 26 to the fixed pad 21a. The mode of blocking the wheel 1 may also be realized by nuts cooperating with the guiding fingers 4 which, in that case, are threaded.

The brake structure proposed makes it possible, in a reduced volume, to make a powerful brake in which the temperature of the braking pieces which are preferably made of carbon/carbon, may be greater than the temperature admitted in the brakes of the prior art. Covering the braking pieces with the product affording protection against oxidation avoids combustion of these pieces at high temperature. The radial aeration passageways 40, made in these pieces, allow a rapid heat exchange with the ambient air. The presence of the radiators 39a and 39b and the small contact surfaces of the hot pieces with the metal pieces avoid an exaggerated rise in temperature of the elements adjacent the braking pieces.

POSSIBILITY OF INDUSTRIAL APPLICATION

This type of brake is particularly adapted to any type of vehicle subjected to frequent, powerful brakings, and, in particular, to racing cars.

We claim:

1. A disc brake assembly for a wheel rotatably mounted upon an axle of an automotive vehicle comprising:
   an annular disc including an inner annular member coaxially mounted about the axle to rotate wit the wheel, a concentric outer annular member having opposing, annular braking surfaces and means for interconnecting said inner and outer annular members for co-rotation while permitting relative axial movement therebetween, said interconnecting means defining a plurality of axial openings for the intake of a cooling medium, said disc further including a plurality of passageways extending radially therethrough in fluid communication with said axial openings;
   first and second annular brake pads coaxially mounted about said disk, each of said brake pads having a friction surface adapted to engage and substantially totally cover a respective one of the opposing, annular braking surfaces of said disc, said brake pads including a plurality of radial passages therethrough in fluid communication with said axial openings;
   means for axially shifting at least one of said brake pads relative to said disc to engage said friction surfaces with said braking surfaces; and
   pad support means for positioning said brake pads relative to said disc, said pad support means spanning between said brake pads and including an axially extending peripheral wall provided with a plurality of radial openings for permitting the flow of the cooling medium from said radial passages and passageways therethrough, wherein said first brake pad is axially fixed relative to the axle, said second brake pad is axially shiftable, relative to said first brake pad, by said means for axially shifting and said pad support means includes a plurality of spaced bridges interconnecting said first and second brake pads to prevent rotation thereof, said plurality of spaced bridges collectively comprising said peripheral wall.

2. The disc brake assembly according to claim 1, wherein said pad support means comprises a first rigid annular shield coaxially mounted relative to said disc, said means for axially shifting being located axially between said second brake pad and said first rigid annular shield.

3. The disc brake assembly according to claim 2, further comprising first thermal protection means between said second brake pad and both said means for axially shifting and said first rigid annular shield.

4. The disc brake assembly according to claim 3, wherein said pad support means comprises a second rigid annular shield coaxially mounted relative to said disc adjacent said first brake pad, said first and second rigid annular shields being interconnected by said plurality of spaced bridges, said disc brake assembly further including second thermal protection means between said first brake pad and said second rigid annular shield.

5. The disc brake assembly according to claim 4, wherein said disc and said brake pads are entirely covered, except for their respective braking and friction surfaces, with an oxidation protection coating.

6. The disc brake assembly according to claim 5, wherein said first and second thermal protection means comprise radiators.

7. The disc brake assembly according to claim 2, wherein said means for axially shifting comprises a plurality of hydraulic jacks each of which is disposed adjacent one of said plurality of spaced bridges.

8. The disc brake assembly according to claim 7, wherein each of said jacks comprises a chamber, former in said first rigid annular shield and opening toward said second brake pad, and a piston slidably mounted in said chamber so as to engage and axially shift said second brake pad, said chambers being interconnected by fluid conduits.

9. The disc brake assembly according to claim 8, wherein at least a portion of said fluid conduits are formed integral with said first rigid annular shield.

10. The disc brake assembly according to claim 9, wherein said disc and said brake pads are entirely covered, except for their respective braking and friction surfaces, with an oxidation protection coating.

11. The disc brake assembly according to claim 1, wherein said interconnecting means comprises a plurality of spaced tenons extending radially inward from said outer annular member and a plurality of fins extending radially outward from said inner annular member, said tenons being located between respective fins to permit co-rotation of said inner and outer annular members while permitting relative axial movement therebetween.

12. The disc brake assembly according to claim 11, wherein the number of fins supporting the braking efforts when the vehicle is in reverse motion is less than the number of fins supporting the braking efforts when the vehicle is in forward motion.

13. The disc brake assembly according to claim 12, wherein said disc and said brake pads are entirely covered, except for their respective braking and friction surfaces, with an oxidation protection coating.

14. The disc brake assembly according to claim 1, wherein said disc and said brake pads are entirely covered, except for their respective braking and friction surfaces, with an oxidation protection coating.

15. The disc brake assembly according to claim 2, wherein said pad support means comprises a second rigid annular shield coaxially mounted relative to said disc adjacent said first brake pad, said first and second rigid annular shields being interconnected by said plurality of spaced bridges.

* * * * *